(12) United States Patent
Harrison et al.

(10) Patent No.: US 6,941,476 B2
(45) Date of Patent: Sep. 6, 2005

(54) INFORMATION STORAGE (75) Inventors: Keith Alexander Harrison, Monmouthshire (GB); Brian Quentin Monahan, Bristol (GB); Marco Casassa Mont, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 804 days.

(21) Appl. No.: 09/852,262

(22) Filed: May 10, 2001

(65) Prior Publication Data

US 2001/0049786 A1 Dec. 6, 2001

(30) Foreign Application Priority Data

May 31, 2000 (GB) .............................................. 0013041

(51) Int. Cl.[7] .......................................... G06F 13/14
(52) U.S. Cl. ................................................... 713/201
(58) Field of Search ............................... 713/201, 153, 713/157, 200; 709/225, 229; 380/259, 264, 282, 286; 705/25, 56, 64, 65

(56) References Cited

U.S. PATENT DOCUMENTS

| | | | | |
|---|---|---|---|---|
| 6,052,785 A | * | 4/2000 | Lin et al. ..................... | 713/201 |
| 6,119,230 A | * | 9/2000 | Carter ......................... | 713/200 |
| 6,219,790 B1 | * | 4/2001 | Lloyd et al. ................. | 713/201 |
| 6,263,446 B1 | * | 7/2001 | Kausik et al. .............. | 713/201 |
| 6,311,269 B2 | * | 10/2001 | Luckenbaugh et al. ..... | 713/154 |
| 6,606,663 B1 | * | 8/2003 | Liao et al. ................... | 709/229 |

OTHER PUBLICATIONS

Search Report under Section 17, dated Jan. 11, 2001.

* cited by examiner

*Primary Examiner*—Gregory A Morse
*Assistant Examiner*—Ellen C Tran (57) ABSTRACT

A distributed storage system for storing at least one credential (46), provided by an issuing authority and relating to an identity (42, 44), is described. The system comprises: a plurality of unique identities (42, 44) each having a local store (40). Each local store (40) securely stores credentials (46) relating to the owner of the identity (42, 44). The system also comprises one or more security certificates (66) provided at each identity (42, 44) for ensuring the authenticity of the credentials (46). The security certificates (66) provide secure references to the issuers of the credentials (46) and this can be used in verifying the origin of each credential (46). The identity can be provided a website or a mobile phone for example.

24 Claims, 9 Drawing Sheets

Prior Art

INFORMATION STORAGE

TECHNICAL FIELD

The present invention concerns improvements relating to information storage and more particularly, though not exclusively to an information system in which the credentials of an entity can be securely stored and interrogated when access to services is to be provided.

BACKGROUND OF THE PRESENT INVENTION

Secure information storage is essential for any system which relies on the credibility of the information to work. For example, in a system where a person has credentials when enable him or her to access different types of information or services, a great deal of resources are devoted to ensuring that the integrity of the credentials is maintained. This has in the past involved centralised secure data storage which the credential issuing authorities can regulate and control. One such system is now described with reference to FIG. 1.

Figure 1:
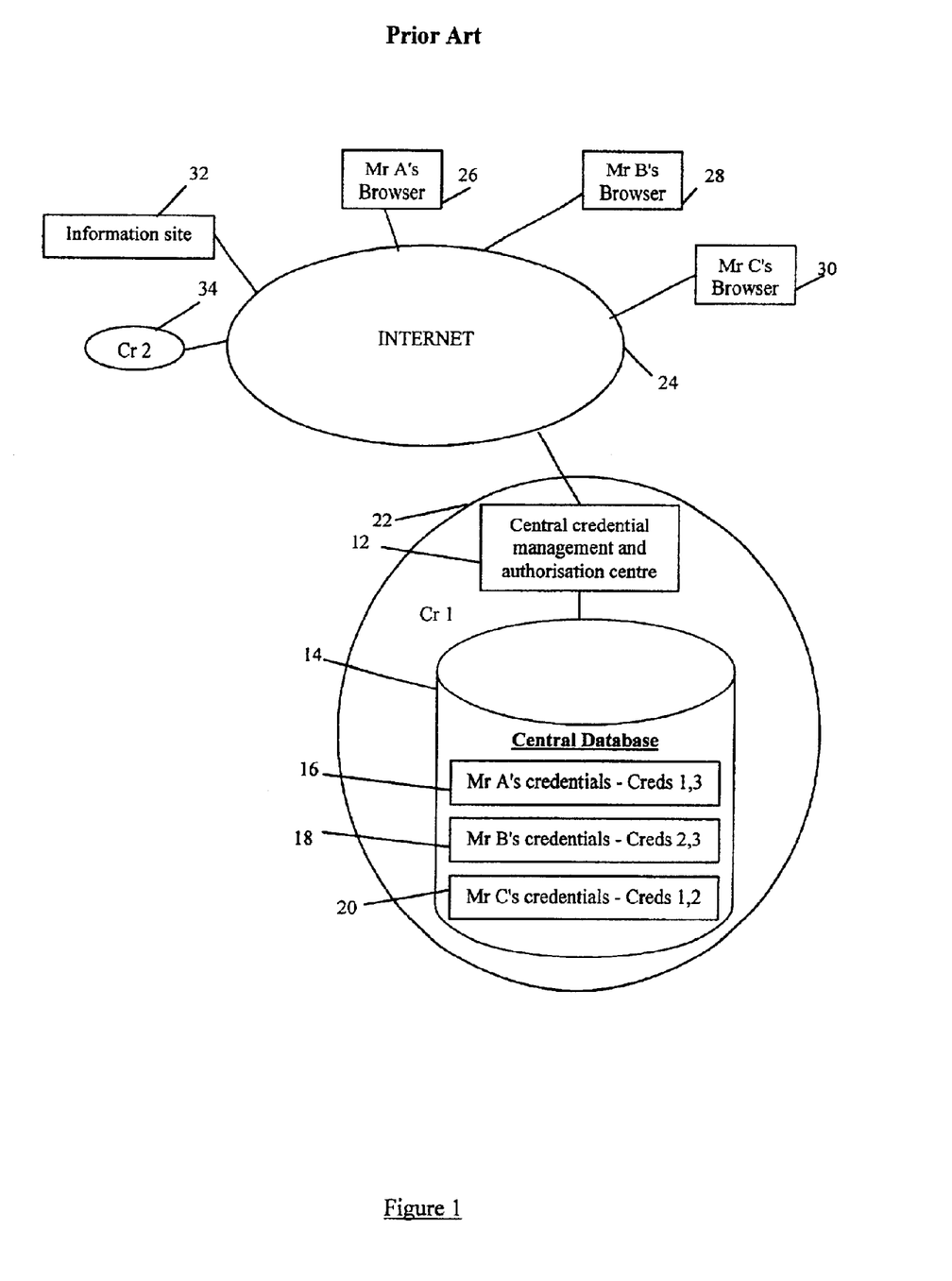
FIG. 1 is a schematic block diagram showing a conventional system for authenticating an owner's credentials to allow access to services.

A prior art system 10 for storing and providing access to a user's credentials (or permissions) comprises a central credential management and authorisation centre 12 and a central database 14. The central database 14 stores information concerning all the users who are registered with the central credential management and authorisation centre 12. In the present illustration there are three users, Mr A, Mr B and Mr C. Each user has its own set of credentials which are stored at dedicated location sites 16, 18, 20 within the central database 14.

The central credential management and authorisation centre 12 and the central database 14 are owned by the credential issuing authority 22 which in this illustration is labelled CR1. The credential issuing authority 22 can maintain the security of the credentials it has issued because it controls their storage, updating, revocation and also proxying (when one credential is temporarily assigned to another user).

The CR1 credential issuing authority 22 is connected in this illustration to the Internet 24 (though in practice this could be an communications medium). This allows the users (Mr A Mr B and Mr C) to access the site from their respective web browsers 26,28,30. Furthermore, an information site 32 can also access the credentials stored at the credential issuing authority 22 as is described below in the following example.

When Mr A wishes to access a service from the information site 32 via his web browser 26, Mr A requests the service and provides information which identifies his credential issuing authority 22. (Typically, this may be realised in credit card details being provided by Mr A to the information site which needs to check his credit limit from the credit card issuing authority.) The information site 32 then requests Mr A's credentials from the credential issuing authority 22. Mr A's credentials 16 are retrieved from the central database 14 by the central credential management and authorisation centre 12 and forwarded to the information site 32. If Mr A's credentials are sufficient to allow access the requested services, the information site 32 supplies them to Mr A.

Supplying credentials in this way is secure and appears to be relatively straightforward for the single enquiry case. However, in practice the database 16 typically stores the credentials of hundreds of thousands of users. This gives rise to a problem that as the number of users increases, access time increases slowing down the operation of the system 10. This time delay is an inherent problem associated with a centrally provided resource but has been accepted up to now by users and authorities alike because of the ease with which the security issues of the credentials can be handled.

Another difficulty is that the central database will need to update its information at regular intervals and, during this downtime, it is generally not possible for any third party to access information within the database 16, even if that information is itself not being updated. Also, if Mr A wishes to proxy some of his credentials to Mr B then Mr A can only make a request which will hopefully be actioned by the credential issuing authority 22 at its next update. The difficulty is that Mr A can only indirectly carry out the proxy because he is relying on the credential issuing authority 22 to make the necessary changes to his and Mr B's credentials 18 stored in the database 14.

Furthermore, if Mr A wishes to assign his credentials to another person who is not registered with the credential issuing authority 22, but with another credential issuing authority 34 (CR 2) then this may simply not be possible as CR1 may consider such an external proxy to be a loss of control over their credentials. If it is possible, then the procedure for updating the other person can be very complicated and time consuming. Also the revocation or updating of the credentials proxied to people registered with other authorities 34 becomes complicated and slow to implement.

OBJECTS AND SUMMARY OF THE INVENTION

It is an object of the present invention to overcome or at least substantially reduce the above described problems.

The present inventors have appreciated that as far as a computer is concerned, the user's actual name is not particularly important What is important, however, is what the user is permitted to do. In this regard, the present invention resides in the appreciation that each entity can have their own personal identity and that this personal identity can be used as a store of the entity's credentials. In order to ensure the integrity of each personal identity and its associated credentials, security certificates are provided which can be used to verify the authenticity of the credentials and the owner of the credentials.

As the identities are provided with security certificates, it is possible to store the identities and their credentials in a distributed manner. This overcomes the above described problems related to the inherent bottleneck associated with centralised systems.

More specifically, according to one aspect of the present invention there is provided a distributed storage system for storing at least one credential, provided by an issuing authority and relating to an identity, the system comprising: at least one unique identity having a local store, the store of the at least one identity securely storing one or more credentials relating to the owner of the identity; and a security certificate provided at each identity for ensuring the authenticity of the one or more credentials, the security certificate providing a secure reference to the issuer of the one or more credentials that can be used in verifying the origin of each credential.

The present invention enables user management of credentials in a much simpler, straightforward, faster and cost effective manner. Revocation of any credential can be carried out immediately by revoking the certificate which relates to the credential. Updating an entity's credentials is also easier and immediate with the issuer having access to the identity's store by way of a robust security check. Proxying credentials also becomes faster and easier as it is controlled by the owners of the identities rather than a central maintenance authority. This direct control is one of the key advantages provided by the present invention. Also updating, revocation or proxying of any credential does not interfere with any other procedure relating to the identity of another entity because of the distributed nature of the system.

Preferably each identity comprises a hierarchical structure comprising at least one role. The role is a subset of the identity which has its own credentials within the identity but is itself modelled as an identity. Accordingly, an entity's identity can advantageously provide different credentials to different enquirers depending on which role of the identity is being accessed. The provision of such roles is an aid to the management of the information stored within an identity.

Each identity acts a local store of credentials for that entity but does not have to identify the name of its owner, thereby maintaining anonymity of the entity if desired. Also an entity can be a group of individuals whose members can all access the credentials of the entity as required. This is particularly useful for large groups of individuals representing an organisation where certain credentials are given to all employees. Also if roles are provided, special credentials for individuals within the group can also be stored within the hierarchical structure.

An identity may contain a mailbox. Messages to the identity may be sent by other entities to the mailbox. The owner of the identity may access the contents of the mailbox once an authorisation function module arranged to check that a request for access to the mailbox has originated from an authorised identity has verified the owner knows the secret key.

The identity may contain encrypted credentials which can be supplied to all enquirers but only authorised entities may be able to decrypt these credentials for their own use or verification by the use of public/private key encryption/decryption techniques. Again this allows selected provision of credentials to different enquirers as well as maintaining high levels of security regarding certain credentials.

According to another aspect of the present invention, there is provided a method of storing credentials relating to identities provided by an issuing authority in a distributed manner, the method comprising: securely storing one or more credentials relating to the owner of an identity in a local store of the identity; and providing a security certificate at the identity for ensuring the authenticity of the one or more credentials, the security certificate providing a secure reference to the issuer of the one or more credentials that can be used in verifying origin of each credential.

According to a further aspect of the present invention, there is provided an identity of an entity for making available credentials belonging to the entity to other entities, the identity comprising: a local store arranged to securely hold one or more credentials relating to the entity; and a certificate processing module for reading and verifying received security certificates and creating security certificates for transmission, the security certificates providing a secure reference to the issuer of the one or more credentials that can be used in verifying the origin of each credential.

The present invention also extends to a distributed storage system for storing a plurality of credentials, wherein the system comprises a plurality of identities as described above.

BRIEF DESCRIPTION OF THE DRAWINGS

Preferred embodiments of the present invention will now be described by way of example with reference to the accompanying drawings. In the drawings.

DETAILED DESCRIPTION OF THE PREFERRED EMBODIMENTS OF THE PRESENT INVENTION

Figure 2:
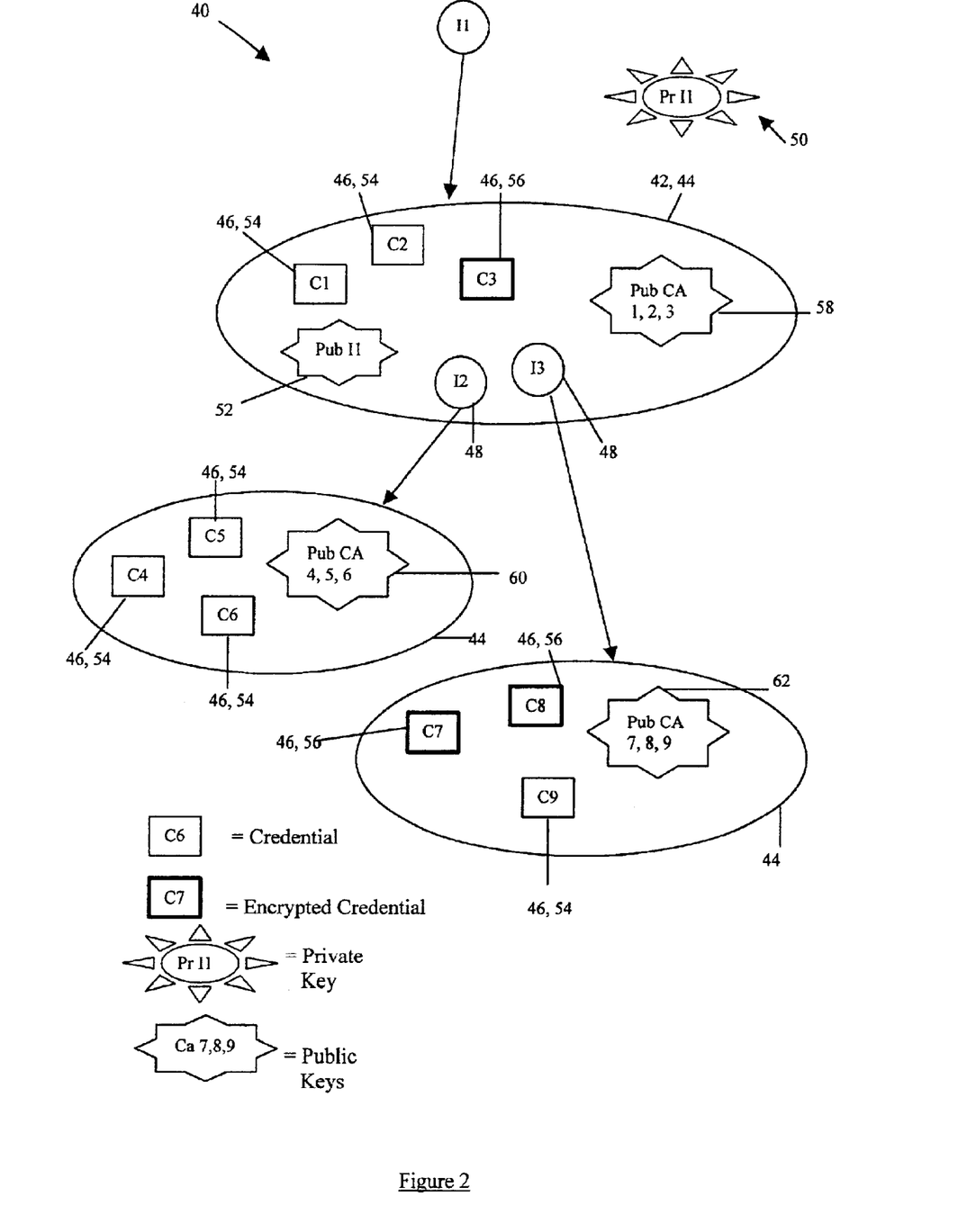
FIG. 2 is a schematic block diagram of a website acting as a store of an owner's credentials according to a first embodiment of the present invention.

Referring now to FIG. 2, there is shown a storage structure 40 of a website used for implementing a new technique of distributed information storage according to the presently preferred embodiments of the present invention. The storage structure 40 is associated with a basic identity 42, which is pointed to by a pointer I1. An identity can be considered to be a universal resource locator (URL) to a set of credentials and other owned identities (roles), i.e. the identity is an address of where the credentials (and other owned identities) can be found.

The storage structure 40 stores several different types of information and is hierarchically arranged as a set of identities 44. The basic type of information stored in the storage structure 40 is a credential 46 (also referred to as a permission). A credential is a digitally signed document which has been signed using a private key of the issuer (the process of digitally signing a document is explained later). A credential 46 determines what its owner (the owner of the identity) is permitted to do and hence sets out the credential details that will be required in use. Also each credential contains a unique serial number, identifies to whom it has been issued and identifies an associated Certificate of Authentication. In practice, an owner goes through life collecting different credentials 46 and associated certificates and adding them to its storage structure 40. In the present embodiment, the owner has nine credentials (C1 to C9).

The credentials 46 are stored in the hierarchical structure 40 which is identity specific. The storage structure 40 contains three identities 44 (though any number can be used in practice). Each identity 44 has its own set of credentials 46 and is accessible via a pointer 48 (I1, I2, I3). In the present embodiment, the two pointers 48 of subsidiary identities (I2 and I3), namely identities 44 owned by the basic identity 42, are provided within the basic identity 42 (I1). These two subsidiary identities (I2 and I3) (also known as roles) are simply addresses of other collections of credentials which ultimately belong to the basic identity 42 such that a total set of credentials owned by the owner is the set of credentials owned directly or indirectly (via the subsidiary identities).

The basic identity 42 has associated with it a secret private key 50 that is used by the owner of the identity to prove that the identity 42, and all of the credentials 46 and other information contained within it, belong to him or her. The way in which the owner does this is explained in detail later.

In addition to the provision of credentials 46 and roles 48 within a given identity 42, 44, the basic identity 42 contains the owner's public key 52. The public key 52 corresponds to the owner's secret private key 50 and can be used to decrypt information encrypted by the secret private key 50. The secret private key 50 is unique to the owner and cannot be determined from analysis of the corresponding public key 52. In practice, there are multiple copies of the owner's public key 52 and a copy is placed within each credential 46. Accordingly, when any credential 46 is supplied to an enquirer, the owner's public key 52 is also supplied automatically (usually in the form of an X.509 certificate). The owner of the identity 42 needs to use the public key 52 to prove that they are entitled to use the identity 42 (described later).

There are two types of credentials 46 shown in FIG. 2, the standard credential 54 and the encrypted credential 56. The standard credentials 54 (C1, C2, C4, C5, C6, C9) provide information to an enquirer without any further security checks and generally concern information which the owner is happy to make publicly available. The encrypted credentials 56, in this embodiment C3, C7 and C8, concern information which the owner wishes to restrict access to. For example, the owner of the present storage structure 40 is a member of a secret organisation to whom he needs to prove his identity each time he accesses information regarding that organisation. However, in order to prevent any unauthorised person from determining that he is a member, the owner has his relevant credentials 46 encrypted and only the intended authorised recipient of the secret information will have the decryption key to decode the encrypted credentials 46, 56.

Each of the credentials 46 which the owner has collected has been issued by a corresponding Certification Authority. In order to obtain such a credential 46, a request is made by the owner of the storage structure 40 to the Certification Authority, the request including the owner's public key 52. If the Certification Authority considers the owner to be acceptable, then the appropriate credential 46 is issued and certified as being issued from the Authority by the issuance of a Certificate of Authentication (not shown) identifying the owner of the storage area 40 and containing his public key 52. The purpose of the certification is that anyone can ultimately verify where the credential was validly issued. The Certification Authority also supplies any other certificates (not shown) which establish how the Certification Authority has been authorised itself. The Certification Authority encodes its digital signature for each issued credential 46 and, in order to read the signature, a public key is required at the storage structure 40. Accordingly, each credential 46 is provided with a public key 58, 60, 62 in the storage structure 40 which allows its signature to be decoded once it has been received from the Certification Authority. These public keys 58, 60, 62 are obtained from the relevant Certificates of Authentication as is described later.

As mentioned above, in order to prove that the credentials 46 were validly issued by a Certification Authority, each credential 46 has associated with it a Certificate of Authentication which has been digitally signed by the Certification Authority. Usually several credentials 46 are associated with a single certificate, though in the present embodiment, each credential 46 (C1 to C9) has its own certificate issued by a different Certification Authority (CA1 to CA9).

Figure 3:
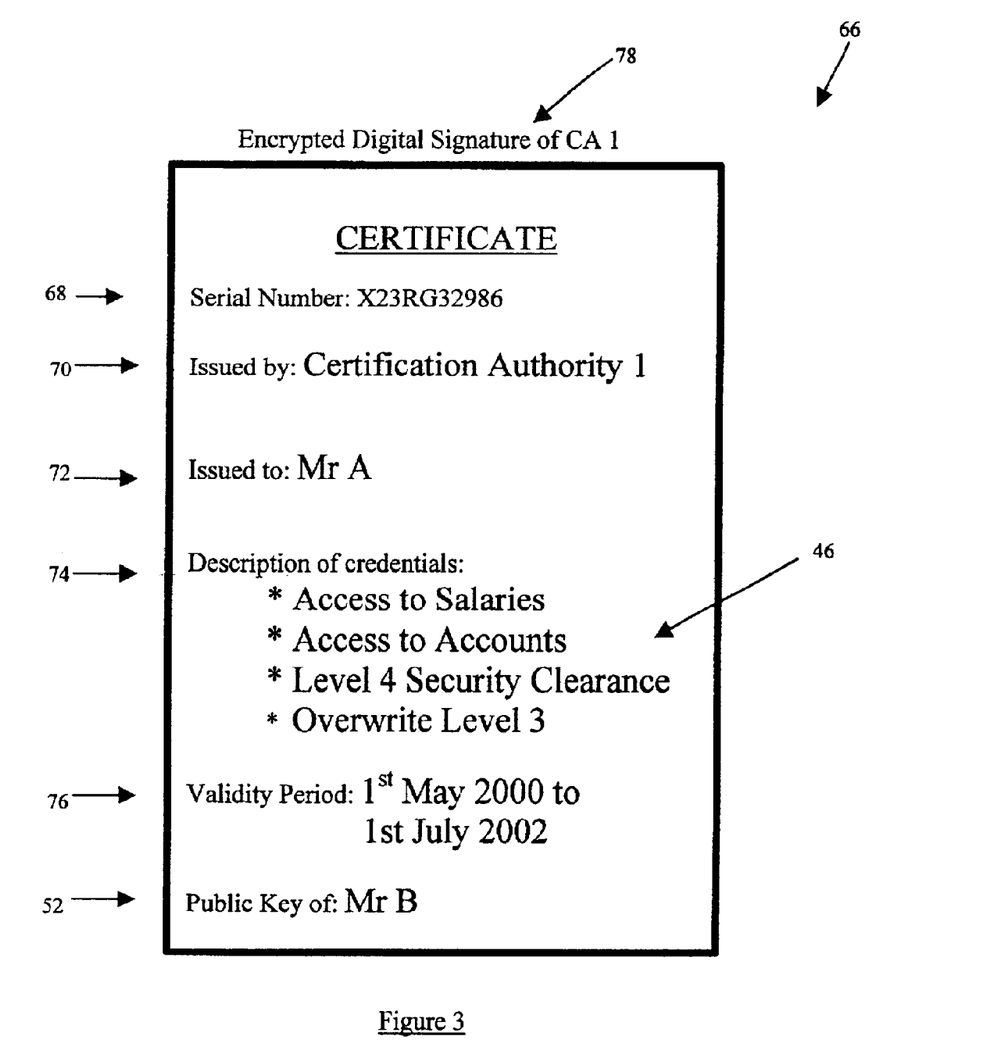
FIG. 3 is a schematic representation of a digitally signed authentication certificate issued to the owner's website by a Certification Authority according to the first embodiment of the present invention.

Referring now to FIG. 3, a Certificate of Authentication 66 issued by Certification Authority CA1 is shown. The certificate 66 sets out the following fields 66 specifying: a unique serial number 68 of the certificate (used in certificate revocation); the name of the current issuing authority 70, to whom 72 the certificate 66 was issued, a list 74 of encrypted or non-encrypted credentials 46 granted by the Certification Authority CA1, a validity period 76 during which the certification will be valid and the public key 52 of the authorised bearer (Mr A). The serial number 68 and the name of the issuing authority 70 are used as means of identification and are found in any credentials 46 issued by the Certification Authority.

The Certificate of Authentication 66 also comprises a digital signature 78 which is created by the Certification Authority CA1. The purpose of the digital signature is to ensure that the digitally signed document was created by the issuer and to ensure that the contents cannot undetectably be altered. The signature 78 is generated by the Certification Authority CA1 in a two-stage process. In the first stage, the contents of the certificate 66 are processed by a special hash algorithm which takes the entire contents of the certificate 66 and produces a very small fingerprint (typically only 20 bytes in size) which represents the entire data. The special hash algorithm operates in such a way that it is computationally infeasible to find another document with the same fingerprint. This special hash algorithm is publicly available in order for checks to be made on the integrity of the data (credentials) within the certificate 66 as will be described later. In the second stage, the fingerprint is encrypted using the secret private key (not shown) of the Certification Authority CA1. The digital signature of each credential 46 is also generated in a similar manner by the issuer of a credential.

Each identity (42, 44) extracts a relevant Certification Authority's public key 58, 60, 62 which can be used to decode the digital signature 78 of the certificate 66. These public keys 58, 60, 62 are provided within the credentials issued by each certification Authority for example or are generally available from the Certification Authority upon request. In the present embodiment, there are nine different Certification Authorities who have each issued a single credential 46 thereby giving rise to nine different certificates (not shown). The storage structure 40 obtains nine different public keys 58, 60, 62 which relate to the corresponding Certification Authorities (CA1 to CA9) in order to decode their respective certificates.

Figure 4:
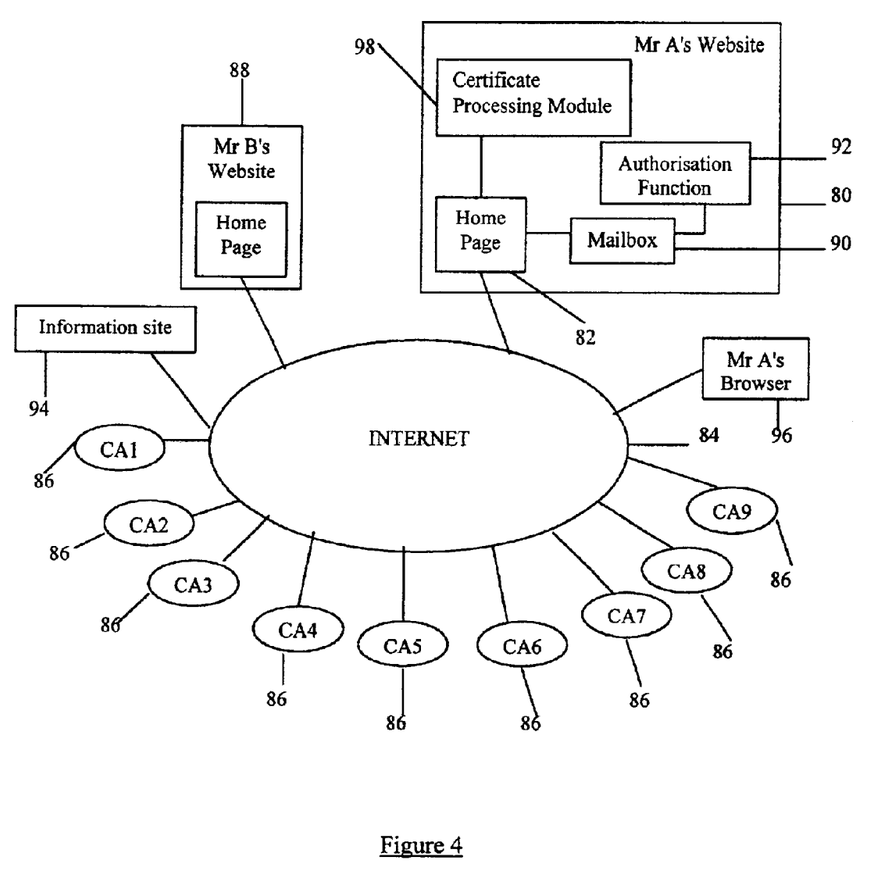
FIG. 4 is a schematic block diagram showing different entities connected via the Internet including the website of FIG. 2 for authenticating an owner's credentials to allow access to services using the digitally signed certificate of FIG. 3.

Referring now to FIG. 4, the way in which the storage structure 40 is accessed by third parties and is updated is now described by way of example. The storage structure 40 is provided at Mr A's website 80. In this regard, it has a home page 82 which is generally accessible to all enquirers and provides public information about the identity of the owner. From the home page 82, other web pages, which make up the storage structure 40 and which store Mr A's credentials, are accessible.

The website 80 is connectable to the world via the Internet 84 and, in particular, is connectable to each of the Certification Authorities 86 (CA1 to CA9). This is an online connection which enables any of the Certification Authorities 86 to update or revoke any of the credentials 46 they have given to Mr A at any time and this will be described in detail later. Also connected to the Internet 84 is a colleague of Mr A's called Mr B. Mr B also has a website 88 which has a storage structure similar to that of Mr A's. The way in which Mr A can authorise Mr B with some of the credentials that Mr A has in his possession (by way of proxy) will also be described later.

In the present embodiment, Mr A's website 80 has a mailbox 90 provided which can be used to store messages to the owner. Mr A can access the contents of the mailbox 90 once an authorisation function 92 running in conjunction with the mailbox 90 has verified that the person claiming to be Mr A is the true owner. The authorisation function 92 does this by requiring Mr A to use this secret private key 50 such that use of Mr A's public key 52 at the website 80 can confirm Mr A's true identity. More specifically, the manner in which this verification is carried out is similar to a verification procedure carried out by an information site 94 as will be described later.

The processes for supplying credentials updating/revoking credentials and proxying credentials, which are to be described below are controlled by a certificate processing module 98 provided at Mr A's website 80.

Figure 5:
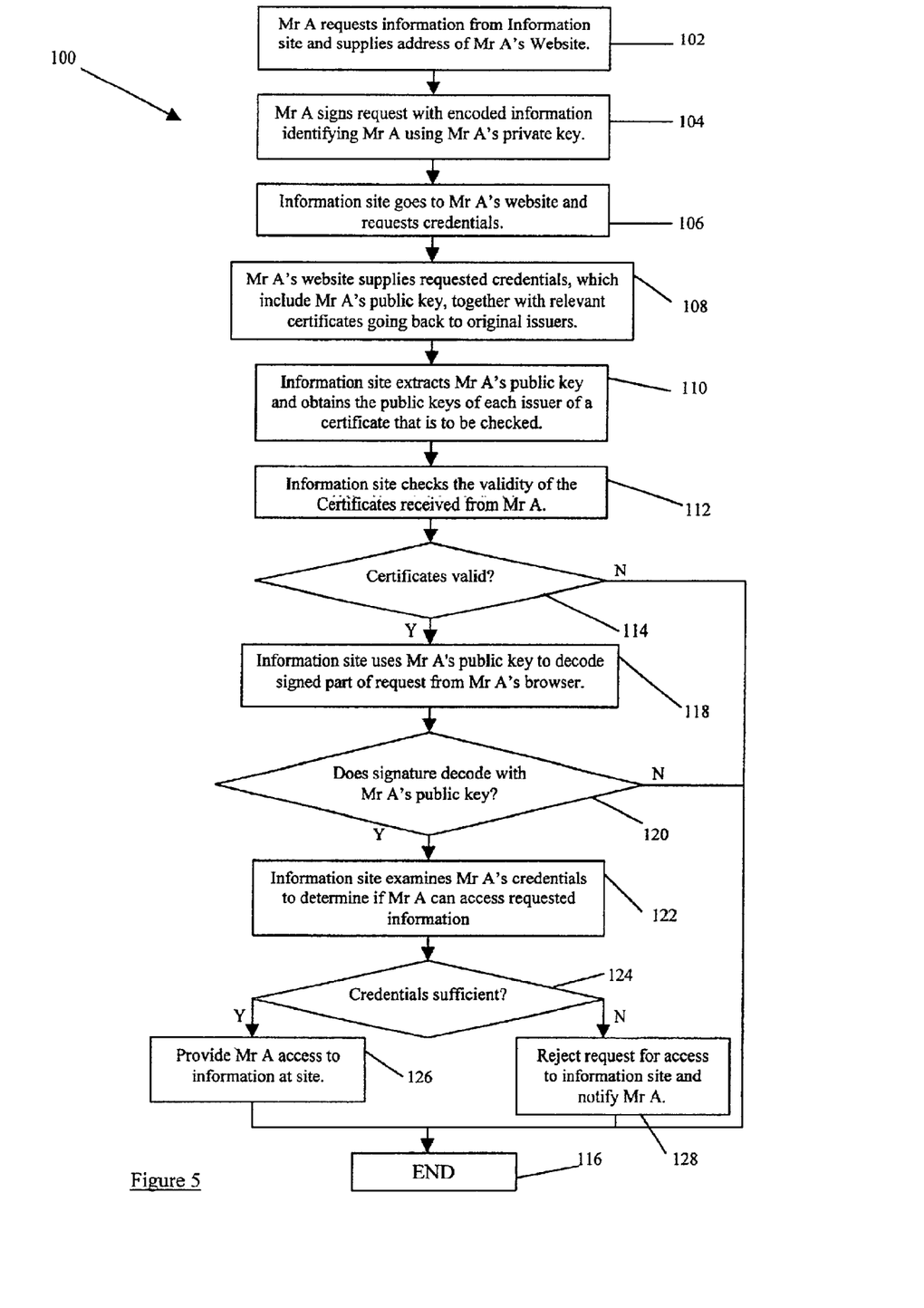
FIG. 5 is a flow diagram illustrating the process of securely accessing information from the owner's website according to the first embodiment.

Mr A's website 80 is used to provide credentials to an enquirer. An example of how this is achieved is now described with reference to an information site 94, which requires the information to verify Mr A's enquiry from a web browser 96. Referring to FIG. 5, a flow diagram illustrating the process 100 of securely accessing information from the owner's website 80 commences at 102 with Mr A making a request for information from the information site 94. The request includes providing the information site with the address of Mr A's website 80 where his credentials 46 are stored. The request is signed at 104 by Mr A with digitally encoded information which identifies Mr A. This information is encrypted using Mr A's private key 50.

The information site 94 upon receiving this request, goes at 106 to the website address provided, that of Mr A's, and requests Mr A's credentials 46 and any relevant certificates going back to the original issuers of the credentials. More specifically, in this embodiment, the request specifies that the credentials 46 and certificates relating to Mr A's I2 role 44 are required. Mr A's website 80 then responds by providing the requested credentials 46 (C4, C5, C6) and certificates, which are grouped together in the I2 role 44, to the information site 94. Also, Mr A's public key 52 is supplied as it is present within each credential 46. Optionally, the general credentials 46 (Cl, C2, C3) provided in the basic identity 42 are also supplied together with their relevant certificates. It is to be appreciated that in response to the present request, all the relevant credentials 46 are provided. However, in the case of specially encrypted identities, such as C3, the information site 94 will not be able to understand the encrypted data as it does not have an appropriate decryption key (a private key specific to these credentials). In other situations, the information site 94 may have the appropriate private key for decrypting the specially encrypted credentials 56.

On receipt of the credentials 46 and the associated certificates, the information site 94 extracts at 110 Mr A's public key 52 from the credentials 46 or any of the relevant certificates. The public key of each Certification Authority is also obtained at 110. The information site then checks at 112 the validity of each certificate received from Mr A. Here it is to be appreciated that any certificates issued to CA1 from a further authority (FA) are also supplied and likewise any certificates to the further authority (FA) from a higher authority (HA).

In order to check the validity, the information site 94 goes to a trusted authority, such as Verisign (in this embodiment this is the HA), of the authorities who's certificates have been supplied. The HA's public key is available to the information site 94 as it is embedded in all browsers.

HA's certificate to FA is verified to prove that the certificate was validly issued to FA using HA's public key. Now it is known that FA's certificate is OK, and so FA's public key which was present in HA's certificate can be trusted. Then CA1's certificate from FA can be verified using FA's public key. Once CA1's certificate has been verified, then CA1's public key 58 can be trusted and can be used to likewise verify Mr A's certificate 66 issued by CA1.

The actual checks that are carried out for each verification involve:

1. Checking that the certificate has not been revoked. This typically involves going to a Certificate Revocation List provided by each Issuer;
2. Digesting the contents of the certificate using the hash algorithm and then decrypting the supplied signature using the issuer's public key. The resulting digest (fingerprint) should match the one just generated; and
3. Checking the validity period etc. of the certificate.

All of the above is carried out in the checking step 112 of the process 100. The result of this is assessed at 114 and if there are any discrepancies in any of the certificates, then the process 100 ends at 116. Otherwise, the information site 94 uses at 118 Mr A's public key 52 to decode the signed part of the initial request from Mr A's browser 92. The result of the decoding step is considered at 120. If the signed part is not correctly decoded with Mr A's public key 52, then Mr A is not permitted access the information site 94 and the process 100 of securely accessing information from the owner's website 80 is terminated at 116. Conversely, if the signature does decode with Mr A's public key 52, then this indicates that the original request has come from Mr A and so the process 100 is allowed to continue to the next stage.

At the next stage, the information site 94 examines at 122 Mr A's credentials 46 to determine if Mr A can access requested information. The results of this check are considered at 124, and if the credentials 46 are sufficient, then the information site 94 provides at 126 access to the requested information. If on the other hand, the credentials 46 are not sufficient, then Mr A's request is rejected at 128 and Mr A is notified of this fact. Either way, the process then ends at 116.

Figure 6:
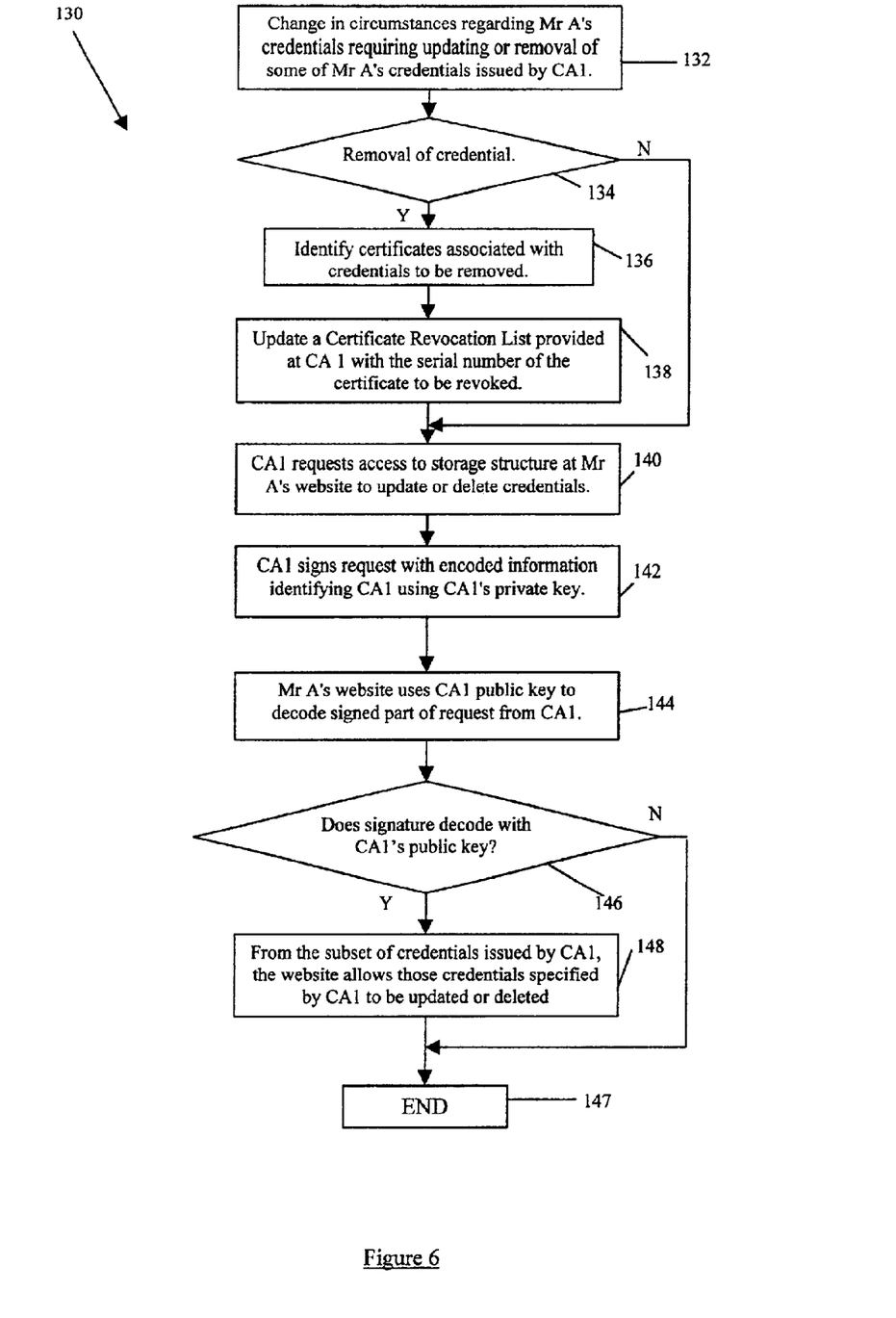
FIG. 6 is a flow diagram illustrating the process of a Certification Authority revoking or updating some credentials of the owner according to the first embodiment.

Referring now to FIG. 6, a flow diagram illustrating the process 130 of a Certification Authority (CA1) revoking or updating some of Mr A's credentials 46, which have been issued by that Certification Authority, is now described. The process 130 commences at 132 with there being a change in circumstances regarding Mr A's credentials 46. This change requires the updating or removal of some or all of Mr A's credentials and certificates issued by the Certification Authority, CA1 in this embodiment. For example, the change may be that Mr A is no longer employed by the company which issued him with some of his credentials and so these now need to be revoked from Mr A's website 80.

If removal is required at 134, then the certificates associated with the credentials 46 that are to be removed are identified at 136. A Certificate of Revocation List (not shown) provided at CA1, is updated at 138 with the serial number 68 of the certificate 66 to be revoked.

Regardless of whether removal is required or not as determined at step 134, CA1 86 now requests at 140 access to the storage structure 40 at Mr A's website 80, in order to delete, overwrite or update the credentials 46 issued by CA1 86 which now require change. CA1 signs at 142 the request with digitally encoded information identifying CA1, using CA1's private key (not shown).

On receipt of the signed request, Mr A's website 80 uses at 144 the CA1 public key 58, 60, 62, which it has in its possession, to decode the signed part of the request from CA1. The result of the decoding step is considered at 146. If the signed part is not correctly decoded with CA1's public key 58, then CA1 is not permitted access to Mr A's website 80 and the update process 130 is terminated at 147. Conversely, if the signature does decode with CA1's public key 58, then this indicates that the credential 46 was issued from CA1 and so the process 130 is allowed access to the credentials 46 to modify them in some way.

More specifically, at 148, the website 80 allows those credentials 46 specified by CA1 to be updated or deleted. It is to be appreciated that the website 80 only permits those credentials which were issued by CA1 to be accessed and so the credential 46 or group of credentials 46 to be modified will usually be a subset of the credentials contained within the storage structure 40. On completion of the modification, the process 130 ends at 147.

Whilst steps 144 and 146 have been shown as a single digital signature decoding and analysis step, this may in an alternative embodiment be as many steps as are required in order to establish the integrity of the instructing party. For example, Mr A's website 80 may request CA1 to supply all its certificates which show that it has the authority to request the revocation. Each of these certificates can then be verified systematically as has been described previously until the authenticity of CA1's authority is established.

If at any stage an identity's website refuses to allow access to its site for the updating procedure, then the certificates verifying that site's credentials can be revoked by being placed on the Certificate Revocation List.

Figure 7:
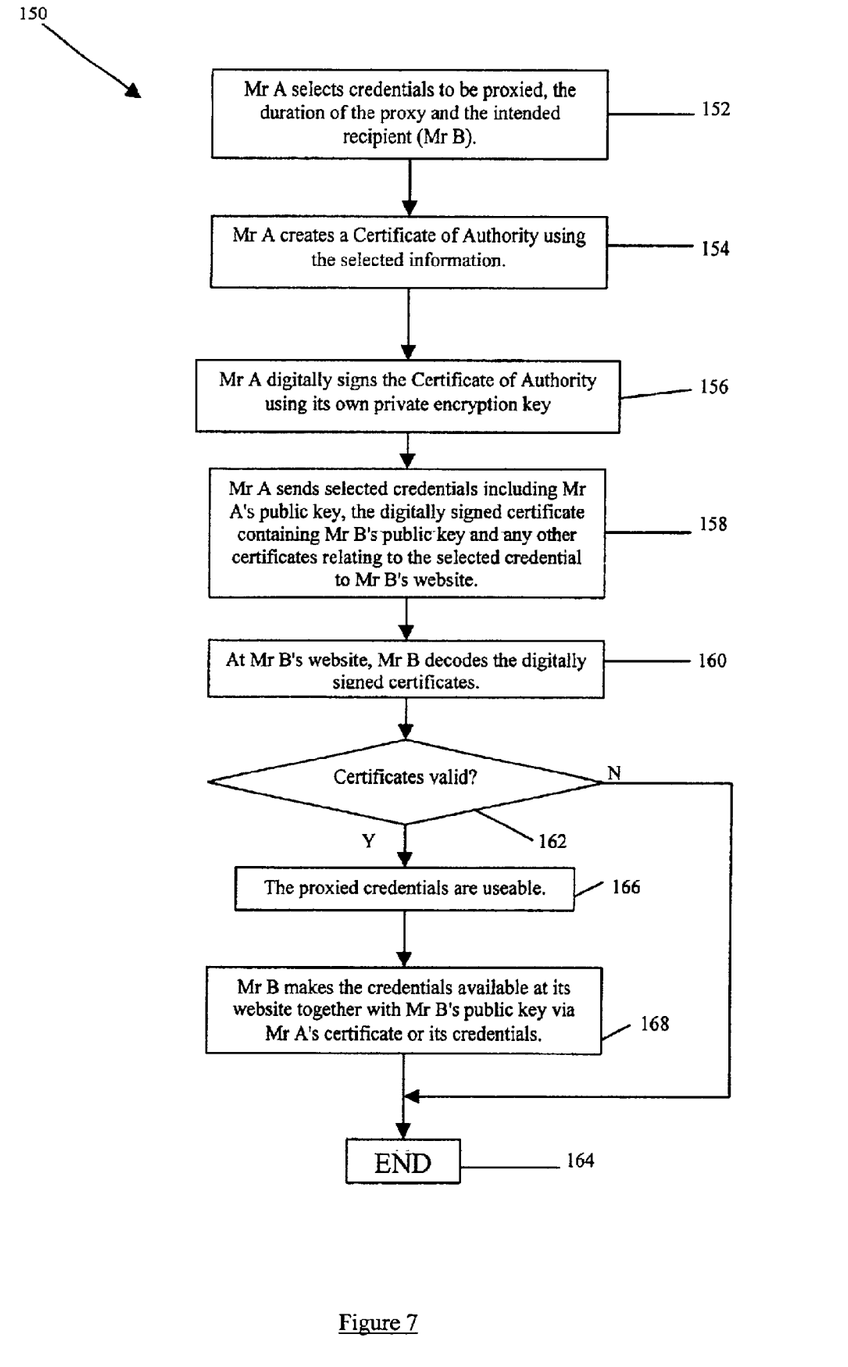
FIG. 7 is a flow diagram illustrating the process of an owner authorising a third party with some of its credentials by way of proxy according to the first embodiment of the present invention.

Referring now to FIG. 7, a flow diagram illustrating the process 150 of Mr A authorising a third party (Mr B in this instance) with some of its credentials 46 by way of proxy is now described. The process 150 starts with Mr A selecting at 152 credentials 46 to be proxied, the duration of the proxy and the intended recipient (Mr B). The term proxy as used herein is to be understood to relate to the temporary assignment of credentials 46 to a third party for example as may be required when an authorised person is to go away on holiday and their deputy is to temporarily take charge of the authorised persons duties.

Once the credentials 46 have been selected, Mr A creates at 154 its own Certificate of Authentication using all the selected information. The certificate is described in detail later with reference to FIG. 8. Mr A then digitally signs at 156 the Certificate of Authority using Mr A's secret private key 50. Mr A sends at 158 the selected credentials 46 including his public encryption key 52, the Certificate of Authentication including the encrypted digital signature, and any other certificates relating to the selected credentials to Mr B's website 88.

At Mr B's website 88, Mr B uses at 160 the public key of a trusted source of at least one of the digitally signed certificates to verify the certificate and the public key of another Certification Authority. This is repeated in a similar manner as described previously until Mr A's public key 52 is verified and can be used to decode the certificate to verify the authenticity of the source of the proxied credentials 46. If any of the certificates are not valid as determined at step 162, then the procedure 150 ends at 164. Otherwise the proxied credentials are considered to be useable at 166 and are stored for further use. At this stage, Mr B makes at 168 the extracted proxied credentials available at its website 88 together with his own public key which is now embedded into each proxied credential. The proxy procedure 150 then ends at 164.

Once Mr B has validly received the proxied credentials, any third party wishing to check whether Mr B is authorised for a particular reason can access the Certificate of Authentication issued by Mr A which proves that Mr B is authorised. If the third party considers Mr B to be a reliable source of credentials, perhaps through past dealings with Mr B, then there is no need for any further authentication checks. If however, Mr B is unknown to the third party or is perhaps considered to be a risk, then as mentioned above, the third party goes through the process of iteratively checking each of the certificates in Mr B's website starting from decoding the trusted source's certificate and working down to Mr A's certificate.

Figure 8:
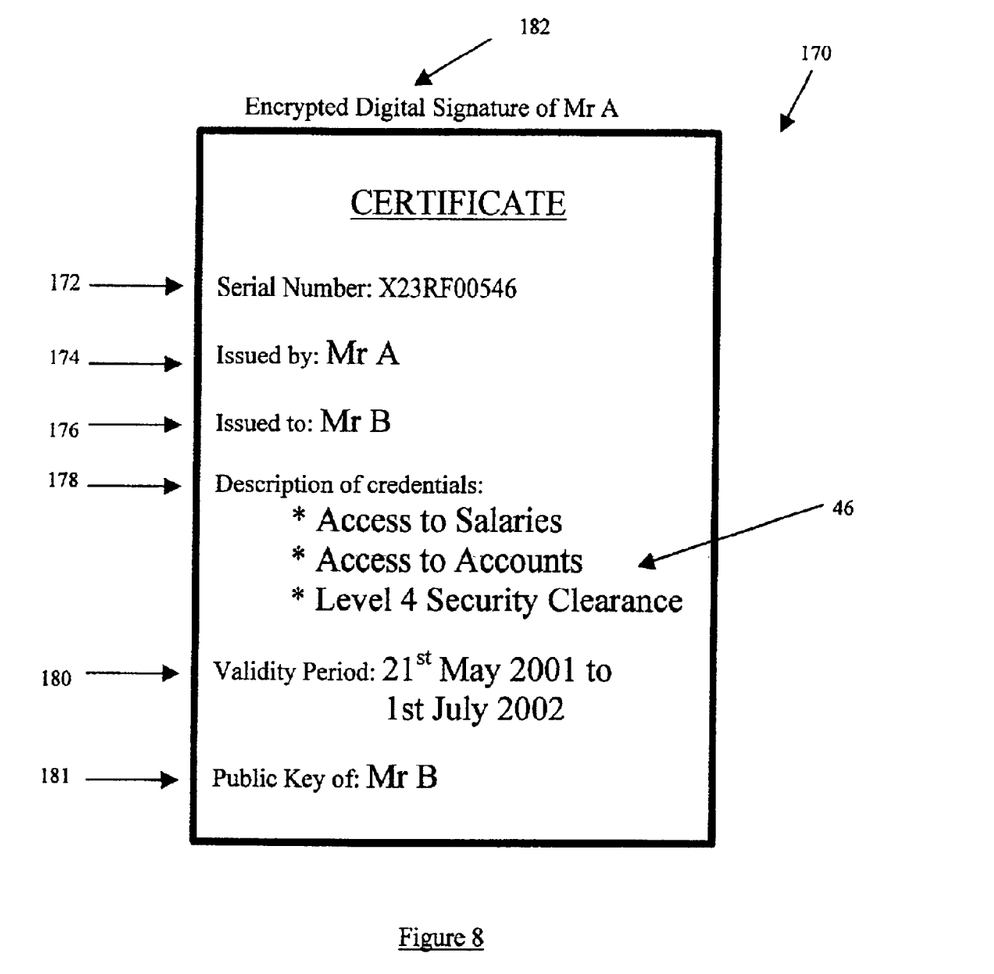
FIG. 8 is a schematic representation of a digital certificate issued by way of proxy to a second owner's website by a first owner according to the first embodiment of the present invention.

Turning now to FIG. 8, a Certificate of Authentication 170 issued by Mr A to Mr B in order to proxy credentials is shown. The certificate 170 has a serial number which is used in revocation procedures. The certificate 170 also sets out who it was issued by 174, to whom it was issued 176, describes at 178 all of the credentials 46 to which it relates, sets out at 180 its validity period and provides the public key 181 of Mr B. In addition, the certificate 170 comprises the digital signature 182 of the present issuer (Mr A). As mentioned before, the digital signature 182 is created by use of Mr A's secret private key 50. In this regard, the structure of the Certificate of Authentication 170 is identical to the certificate 66 shown in FIG. 3.

Figure 9:
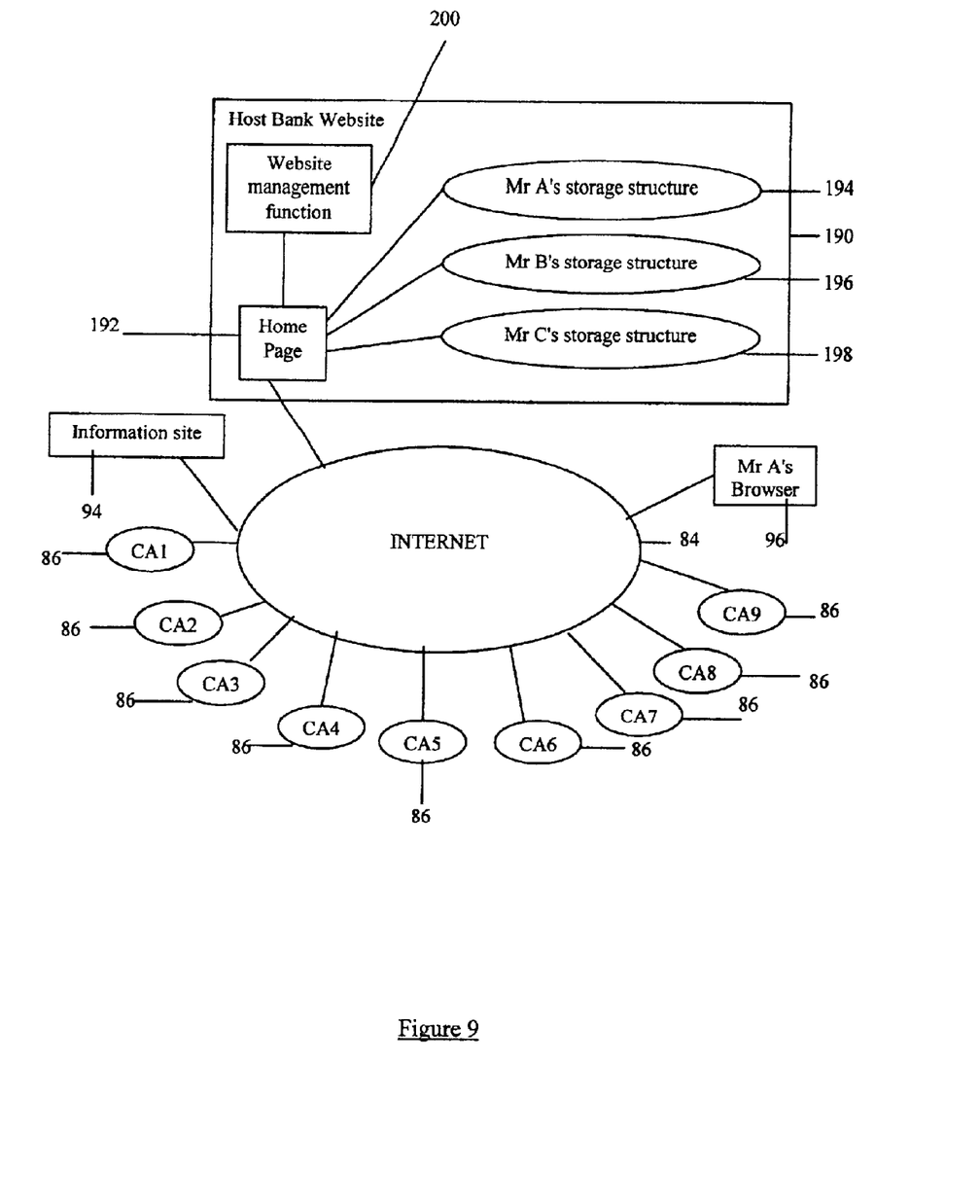
FIG. 9 is a schematic block diagram of a website hosted by a security authority such as a bank, acting as a store of an owner's credentials according to a second embodiment of the present invention.

Referring now to FIG. 9, a second embodiment of the present invention is now described the second embodiment is similar to the first embodiment and accordingly, the following description is restricted to only the differences between the two embodiments to avoid unnecessary repetition.

The major difference between the first and second embodiments, is that rather than a separate website 80, 88 being provided for each storage structure 40, a single website 190 is provided that hosts a plurality of storage structures. More specifically, the host website 190 belongs to a trusted organisation, which in this embodiment is a bank. The website 190 has a home page 192 which provides general information about the host and allows access to the storage structures stored within the website 190. In this embodiment, three storage structures 194, 196, 198 are provided, one for each of three different identities (Mr A, Mr B, Mr C). The website 190 has a website management function 200 similar to that of the first embodiment which provides the necessary control of access to and communication from each of the storage structures 194, 196, 198.

The addresses of each of the storage structures 194, 196, 198 is given as the address of the host bank website 190 and includes some identifier for internal addressing within the website 190. Apart form this difference, the previously described methods of collecting, updating, removing and proxying credentials 46 are the same in this embodiment.

By providing several identity's storage structures 194, 196, 198 within a single website 190 which is managed by a bank, it is possible for the bank to take some responsibility for the maintenance of those storage structures 194, 196, 198. In this way, the authentication procedures can be simplified such that when the host bank's website 190 is accessed, because it is a trusted site, there is no need to seek additional verification by checking the previous issuers of the authentication certificates, even when the identity is previously unknown to the enquirer, such as the information site 94 requesting the credentials 46.

It is to be appreciated that in the above described embodiments, the actual identity of the owner does not have to be made publicly available as it is not required at any place in the storage structure 40. In this case, a label for the owner needs to be known and the permissions of that owner need to be accessible. This may be of particular use when the owner has a desire to retain his anonymity.

In the above described embodiments, the storage structure for an identity can be owned by a group of individuals or objects and used as a shared identity. This is a way that user groups can have access to the same information from within a shared identity (storage structure). The only constraint in this version of the present invention is that each object, or owner, must know the single secret private key of the identity. Clearly the greater the number of people that know the single private key the greater the potential there is for a breach of the integrity of the storage structure.

The present invention is not restricted to a permanent on-line implementation as is provided for in the above-described embodiments which use a website. The present invention can be implemented in many different ways by many different systems. For example, it is possible for the present invention to be realised in the field of mobile telephony. The storage structure 40 can be provided, in this case, in a SIM card of a mobile phone for example. Here access to the storage structure 40 would be way of using the wireless telephony capabilities of the mobile phone. Also any updates or revocation could be provided as soon as the mobile phone is connected to its mobile telephone service provider. This can be considered to be a semi-permanent on-line link.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, whist the present embodiments have been described in relation to the Internet, other wide area networks, such as an intranet for example, can also be utilised as the communication network between the Certification Authorities and the identities.

What is claimed is:

1. A distributed storage system for storing at least one credential, provided by an issuing authority relating to an identity, the system comprising:

at least one unique identity having a local store, the store of the at least one identity securely storing one or more credentials relating to the owner of the identity; and a security certificate provided at each identity for ensuring the authenticity of the one or more credentials, the security certificate providing a secure reference to the issuer of the one or more credentials that can be used in verifying the origin of each credential, the store being accessible by parties other than the owner and being arranged so the parties other than the owner are able to read the credentials and security certificates of the owner.

2. A system according to claim 1, wherein the at least one identity comprises a hierarchical structure.

3. A system according to claim 2, wherein the at least one identity comprises at least one role, the role being a subset of the identity having its own credentials within the identity.

4. A system according to claim 1, further comprising a host site, the host site having a plurality of identities and associated stores.

5. A system according to claim 4, wherein the host site comprises a management module for managing data access to and from the each of the identities and their associated stores.

6. A system according to claim 4, wherein the host site comprises a trusted financial institution's a website.

7. A system according to claim 1, wherein the identity or host site comprises a website.

8. A system according to claim 7, wherein the identity further comprises a homepage for providing general information regarding the identity.

9. A system according to claim 1, wherein the local store of the identity comprises a portable mobile device which is connectable to a telecommunications network.

10. A system according to claim 1, wherein the identity is arranged to store a private key of the identity for encryption of the identity.

11. A system according to claim 10, wherein the identity is arranged to store a public key of the identity for decryption of the identity.

12. A system according to claim 11, wherein the public key of the identity is embedded within each credential of the identity.

13. A system according to claim 1, wherein the identity is arranged to store a public key of the authority which has issued the one or more credentials to the identity.

14. A system according to claim 13, wherein the public keys for each of the at least one role and the identity are stored in the appropriate store or identity.

15. A system according to claim 1, wherein at least some of the credentials are arranged to be encrypted.

16. A system according to claim 1, wherein the one or more credentials each refers to the corresponding security certificate.

17. A system according to claim 1, wherein the security certificate comprises information describing the issuer, the identity to whom the certificate has been issued, a validity period and a list of credentials to which the certificate relates.

18. A system according to claim 1, wherein the certificate is digitally signed using a private key and the certificate contains a public key for reading the digital signature.

19. A system according to claim 1, wherein the identity further comprises a generator module for generating a certificate regarding the identity for use in proxying credentials to the store of a different identity.

20. A system according to claim 1, wherein the identity further comprises a mailbox for receiving messages from other identities.

21. A system according to claim 20, wherein the identity further comprises an authorization function module arranged to check that a request for access to the mailbox has originated from an authorized identity.

22. A method of storing credentials relating to identities provided by an issuing authority in a distributed manner, the method comprising:

securely storing one or more credentials relating to the owner of an identity in a local store of the identity;

providing a security certificate at the identity for ensuring the authenticity of the one or more credentials, the security certificate providing a secure reference to the issuer of the one or more credentials that can be used in verifying origin of each credential; and     accessing the store by parties other than the owner who read the credentials and security certificates of the owner.

23. An identity of an entity for making available credentials belonging to the entity to other entities, each entity comprising:

a local store arranged to securely hold one or more credentials relating to the entity; and     a certificate processing module for reading and verifying received security certificates and creating security certificates for transmission, the security certificates providing a secure reference to the issuer of the one or more credentials that can be used in verifying the origin of each credential, the store being accessible by parties other than the owner and being arranged so the parties other than the owner are able to read the credentials and security certificates of the owner.

24. A distributed storage system for storing a plurality of credentials, the system comprising:

a plurality of identities for making available credentials belonging to an entity to other entities, each entity comprising a local store arranged to securely hold one or more credentials relating to the entity; and     a certificate processing module for reading and verifying received security certificates and creating security certificates for transmission, the security certificates providing a secure reference to the issuer of the one or more credentials that can be used in verifying the origin of each credential, the store being accessible by parties other than said entity and being arranged so entities other than said entity are able to read the credentials and security certificates of said entity.

* * * * *

UNITED STATES PATENT AND TRADEMARK OFFICE
CERTIFICATE OF CORRECTION

PATENT NO. : 6,941,476 B2  
DATED : September 6, 2005  
INVENTOR(S) : Keith Alexander Harrison et al.

It is certified that error appears in the above-identified patent and that said Letters Patent is hereby corrected as shown below:

<u>Title page,</u>  
Item [57], ABSTRACT, should read as follows:  
-- A distributed storage system for storing at least one credential, provided by an issuing authority and relating to an identity, is described. The system comprises: a plurality of unique identities each having a local store. Each local store securely stores credentials relating to the owner of the identity. The system also comprises one or more security certificates provided at each identity for ensuring the authenticity of the credentials. The security certificates provide secure references to the issuers of the credentials and this can be used in verifying the origin of each credential. The identity can be provided a website or a mobile phone for example. --.

Signed and Sealed this

Sixth Day of June, 2006

JON W. DUDAS  
*Director of the United States Patent and Trademark Office*